(12) United States Patent
Hallberg et al.

(10) Patent No.: US 11,148,642 B2
(45) Date of Patent: Oct. 19, 2021

(54) SECURITY SYSTEM

(71) Applicant: Ningbo Geely Automobile Research & Development Co., Ltd., Ningbo (CN)

(72) Inventors: Linus Hallberg, Säve (SE); Alexander Berggren, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/039,380

(22) Filed: Sep. 30, 2020

(65) Prior Publication Data
US 2021/0031724 A1 Feb. 4, 2021

Related U.S. Application Data

(63) Continuation of application No. PCT/CN2019/081555, filed on Apr. 4, 2019.

(30) Foreign Application Priority Data

Apr. 5, 2018 (EP) .................................... 18165881

(51) Int. Cl.
*B60R 25/30* (2013.01)
*B60R 25/23* (2013.01)
(Continued)

(52) U.S. Cl.
CPC ............ *B60R 25/305* (2013.01); *B60R 25/23* (2013.01); *B60R 25/25* (2013.01); *B60R 25/31* (2013.01)

(58) Field of Classification Search
CPC ....... B60R 25/305; B60R 25/23; B60R 25/25; B60R 25/31
(Continued)

(56) References Cited

U.S. PATENT DOCUMENTS 10,836,353 B2 * 11/2020 Zaharia ................. B60R 25/104
10,936,760 B1 * 3/2021 Hadsall ..................... G06K 9/20
(Continued)

FOREIGN PATENT DOCUMENTS

| CN | 103425915 A | 4/2013 |
|---|---|---|
| CN | 103685701 A | 3/2014 |

(Continued)

OTHER PUBLICATIONS

International Search Report and Written Opinion from corresponding International Application No. PCT/CN2019/081555, dated Jun. 27, 2019, 9 pages.
(Continued)

*Primary Examiner* — Kam Wan Ma
(74) *Attorney, Agent, or Firm* — Tucker Ellis LLP

(57) ABSTRACT

A method and security system for preventing misuse of sensitive information entered by an authorized person, including an input interface; a camera a memory configured to store information; a processing circuitry connected to the input interface, the camera and the memory configured to cause security system to activate a first input session wherein the input interface is adapted to receive input of sensitive information by a first person in an operational vicinity of the input interface; detect, by the camera unit, a second face of a second person at a second distance from the input interface; and store a first security association data comprising information regarding the first input session and information about the second person in the memory for preventing misuse of sensitive information.

20 Claims, 4 Drawing Sheets

(51) Int. Cl.
*B60R 25/25* (2013.01)
*B60R 25/31* (2013.01)

(58) Field of Classification Search
USPC .................................................. 340/426.36
See application file for complete search history.

(56) References Cited

U.S. PATENT DOCUMENTS

| | | |
|---|---|---|
| 2010/0205667 A1 | 8/2010 | Anderson et al. |
| 2014/0078164 A1 | 3/2014 | Chan et al. |
| 2014/0198958 A1 | 7/2014 | Eyal et al. |
| 2015/0077235 A1* | 3/2015 | Pisz ...................... B60R 25/104 340/426.23 |
| 2015/0113666 A1 | 4/2015 | Buck |
| 2016/0300410 A1 | 10/2016 | Jones et al. |
| 2017/0123418 A1* | 5/2017 | Erickson .............. G08G 5/0043 |
| 2018/0080263 A1 | 3/2018 | Rose et al. |
| 2020/0034575 A1* | 1/2020 | Wu ........................ G06F 21/74 |

FOREIGN PATENT DOCUMENTS

| | | |
|---|---|---|
| CN | 105227901 A | 1/2016 |
| CN | 106203163 A | 12/2016 |

OTHER PUBLICATIONS

Ali, Mohammed Eunus et al., "Protecting Mobile Users from Visual Privacy Attacks", UBICOMP '14 ADJUNCT, dated Sep. 13-17, 2014, Seattle, WA, USA, 4 pages.

\* cited by examiner

SECURITY SYSTEM

RELATED APPLICATION DATA

This application is a continuation of International Patent Application No. PCT/CN2019/081555, filed Apr. 4, 2019, which claims the benefit of European Patent Application No. 18165881.6, filed Apr. 5, 2018, the disclosures of which are incorporated herein by reference in their entireties.

TECHNICAL FIELD

The disclosure pertains to the field of protecting unauthorized use of sensitive information.

BACKGROUND

Today sensitive information is used for a lot of services. Sensitive information such as passwords, gestures, patterns, voice commands etc. are used for e.g. getting access to services on electronic devices such as computers or smartphones. A Personal Identification Number is another example of sensitive information that is used e.g. to get access to Automatic Teller Machines, buildings and vehicles etc. Input of sensitive information can be done e.g. via a physical keyboard, e.g. a computer keyboard or a number keypad. The sensitive information can also be inputted via e.g. a touch sensitive display on a portable electronic device such as a smartphone or a tablet, or on a touch sensitive device integrated to an external system.

Sensitive information is sometimes seen or heard by an unauthorized person. For example when a person is entering sensitive information on a smartphone someone that is standing behind can see the sensitive information over the shoulder. The same applies to computers, but also to e.g. access control to e.g. a vehicle or a building. There is a risk that the sensitive information that has been seen or heard by an unauthorized person can lead to unauthorized accesses by that person. It is always not possible to know when sensitive information may have been observed by someone unauthorized. A person that has entered a password or Personal Identification Number somewhere may think that no one has seen that password or Personal Identification Number and think that the password or Personal Identification Number is still secure and safe to use. When the password or Personal Identification Number then is used by someone else, it may be very difficult to predict who has entered that password or Personal Identification Number and it may be too late to change password or Personal Identification Number.

SUMMARY

Today there is a demand for better control of identifying possible leak of sensitive information to avoid unauthorized persons to get access to e.g. services that require a login or to get access to buildings, vehicles, etc. A common use case today is the use of e.g. a smartphone for authentication of a lot of private services. When inputting sensitive information, like a password, via the smartphone, there is a risk that someone that is not authorized can observe the sensitive information such as a password, a Personal Identification Number, gesture or voice command.

An object of the present disclosure is to provide a security system and method which seek to mitigate, alleviate, or eliminate one or more of the above-identified deficiencies in the art and disadvantages singly or in any combination.

The inventor makes use of a camera to identify if a non-authorized person is observing the input of sensitive information, typically some sort of password. The camera that is used is able to capture the view in front of an input interface used for input of sensitive information. According to an aspect, if more than one face is identified when a user is making sensitive input to the input interface, the user will be informed that the safety of the input is currently compromised. According to an aspect a display will show who is watching and register what inputted information that possibly could have been seen by someone else that is unauthorized. The suggested solution will prevent that authentication for a service or product, like access to a vehicle, building or bank account, falls into the wrong hands.

The disclosure proposes a security system for preventing misuse of sensitive information entered by an authorized person. The security system comprise an input interface configured to receive input of information by a person, a camera configured to perform face detection of a person and a memory configured to store information and a processing circuitry. The processing circuitry is connected to the input interface, the camera and the memory configured to cause security system to activate a first input session wherein the input interface is adapted to receive input of sensitive information by a first person in an operational vicinity of the input interface. Then the processing circuitry is configured to cause security system to detect, by the camera unit, a second face of a second person at a second distance from the input interface and store a first security association data comprising information regarding the first input session and information about the second person in the memory for preventing misuse of sensitive information. An advantage with the security system is that the stored first security association data can be used for take further actions to prevent unauthorized use of the sensitive information. In other words, with the knowledge of the identified second person and with the knowledge of what sensitive information that may have been observed by the second person, measures can be taken to enhance security. According to an aspect the security system is a vehicle security system for preventing misuse of sensitive information entered by an authorized person e.g. sensitive information entered for getting access to a vehicle.

According to an aspect the processing circuitry is further configured to cause the security system to determine the second distance from the input interface to the second person and generate an alert signal if it is determined that the second person is closer than a predetermined distance from the input interface. In other words the security system is configured to alert a first person of a second person if the second person is closer than the predetermined distance from the input interface in order to make the first person aware of the risk that the second person may be at a distance to observe sensitive information.

According to an aspect the alert signal is displaying an image of the face of the second person on a display. This means that a first person can observe the face of the second person on the display. The first person can then decide if the second person is a trusted person or if the second person is a non-trusted person. The first person is also able to decide if the second person is approaching or if the second person is e.g. just passing by.

According to an aspect the alert signal is any of a recorded voice or predefined sound. An advantage with this is that the first person is alerted by sound in an intuitive way and does not need to see or observe the alert signal via a display.

According to an aspect the playback of the recorded voice or the predefined sound is adapted so that it can be heard by the second person and thereby frighten off the second person.

According to an aspect the processing circuitry is configured to cause the security system to detect, by the camera unit, a first face of the first person at a first distance from the input interface. In other words, the security system is configured to determine who the first person is and to establish that it is the first person that is operating the input interface.

According to an aspect the processing circuitry is configured to cause the security system to determine, by using face recognition data of the first person and face recognition data of the second person obtained by the camera, if the first person and the second person are authorized to input sensitive information via the input interface. An advantage with this is that if the first person and the second person are both authorized to input sensitive information via the input interface then there is no need to store a first security association data or to alert the first person.

According to an aspect the processing circuitry is configured to cause the security system to analyze the first security association data to determine what possible sensitive information that could have been observed by the second person and send information about what possible sensitive information that could have been observed by the second person to an authorized person or authorized entity. This means that a certain sensitive information can be isolated and dealt with by an authorized person or authorized entity in order to prevent misuse of sensitive information. In other words the possible sensitive information that could have been observed by the second person can be changed or locked for further use.

According to an aspect the processing circuitry is configured to cause the security system to analyze the first security association data to determine what possible sensitive information that could have been observed by the second person and discard any further attempt to input the same sensitive information via the input interface again. This means that the security system is adapted to identify possible sensitive information that could have been observed by the second person and take measure to prevent further use of that possible sensitive information.

According to an aspect the security system further comprising a sensor configured to detect a person approaching the sensor. An advantage with a sensor is that the sensor can be used for other purposes when not used in the security system. Another advantage is the placement of the sensor is flexible.

According to an aspect the sensor is any of a lidar sensor, a radar sensor, a sonar sensor, a humidity sensor or a temperature sensor. In other words plural types of sensors can be used and the sensor can be used for other purposes.

According to an aspect the processing circuitry is configured to cause the security system to determine by using any of the camera or the sensor to determine that the second person is approaching the input interface and generate an alert signal based on that the second person is approaching the input interface. In other words this means that the camera or the sensor can be used to alert the first person if the second person is approaching. An advantage is that the camera and the sensor can be configured to operate in combination.

According to an aspect the security system is configured to initiate communication with a remote surveillance system to start recording of the second person by the remote surveillance system. An advantage with this is that the remote surveillance system can be configured to record e.g. images and/or sound of the second person to get more details of the second person, e.g. for enhanced face detection.

The disclosure further proposes a vehicle comprising a door entrance system, a communication interface for communication with a remote server via a communications network and the security system and aspects of the security system as previously described, wherein the security system is adapted to send face recognition data obtained by the camera to the remote server for determining if a person is authorized to access the door entrance system. In other words face recognition data of a first person and a second person can be used to determine, at the remote server, if the first person and/or the second person are authorized to access the door entrance system.

The disclosure further proposes a method for preventing misuse of sensitive information entered by an authorized person. The method comprising the step of activating a first input session wherein the input interface is adapted to receive input of sensitive information by a first person in an operational vicinity of the input interface. This is followed by the step of detecting, by a camera unit, a second face of a second person at a second distance from the input interface. This is followed by the step of storing a first security association data comprising information regarding the first input session and information about the second person in the memory for preventing misuse of sensitive information. An advantage with the security system is that the stored first security association data can be used for take further actions to prevent unauthorized use of the sensitive information. In other words, with the knowledge of the identified second person and with the knowledge of what sensitive information that may have been observed by the second person, measures can be taken to enhance security.

According to an aspect the method further comprising the step of determining the second distance from the input interface to the second person and then the step of generating an alert signal if it is determined that the second person is closer than a predetermined distance from the input interface. In other words the security system is configured to alert the first person of a second person if the second person is closer than a certain distance from the input interface in order to make the first person aware of the risk that the second person may be at a distance to observe sensitive information.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
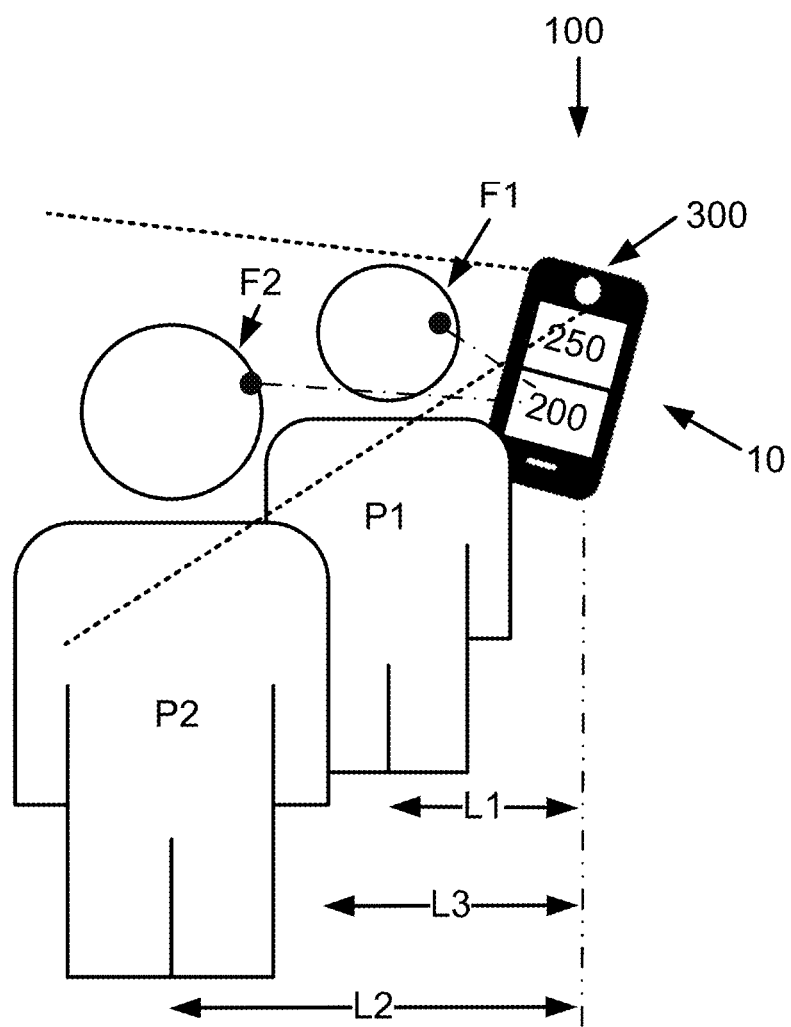
FIG. 1A illustrates an example of the proposed security system used in a portable electronic device.

Aspects of the present disclosure will be described more fully hereinafter with reference to the accompanying drawings. The method and system disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Today there is a demand for better control of identifying possible leak of sensitive information to avoid unauthorized persons to get access to e.g. services that require a login or to get access to buildings, vehicles, etc. A common use case today is the use of an electronic device, e.g. a smartphone, for authentication of a lot of private services. When inputting sensitive information, like a password, via the smartphone, there is a risk that someone not authorized can observe the sensitive information such as a password, Personal Identification Number, gesture or voice command.

The inventor has identified that there is a need for a solution that can prevent that sensitive information, such as authentication for a service or product, like access to a vehicle falls into the wrong hands. An object of the present disclosure is to provide a security system and method which seek to mitigate, alleviate, or eliminate one or more of the above-identified deficiencies in the art and disadvantages singly or in any combination.

The inventor makes use of a camera to identify if a non-authorized person is observing the input of sensitive information, typically some sort of password. The camera that is used is able to capture the view in front of an input interface used for input of sensitive information. According to an aspect, if more than one face is identified when a user is making sensitive input to the input interface, the user will be informed that the safety of the input is currently compromised. According to an aspect a display will show who is watching and register what inputted information that possibly could have been seen by someone else that is unauthorized. The suggested solution will prevent that authentication for a service or product, like access to a vehicle, building or bank account, falls into the wrong hands.

Figure 1B:
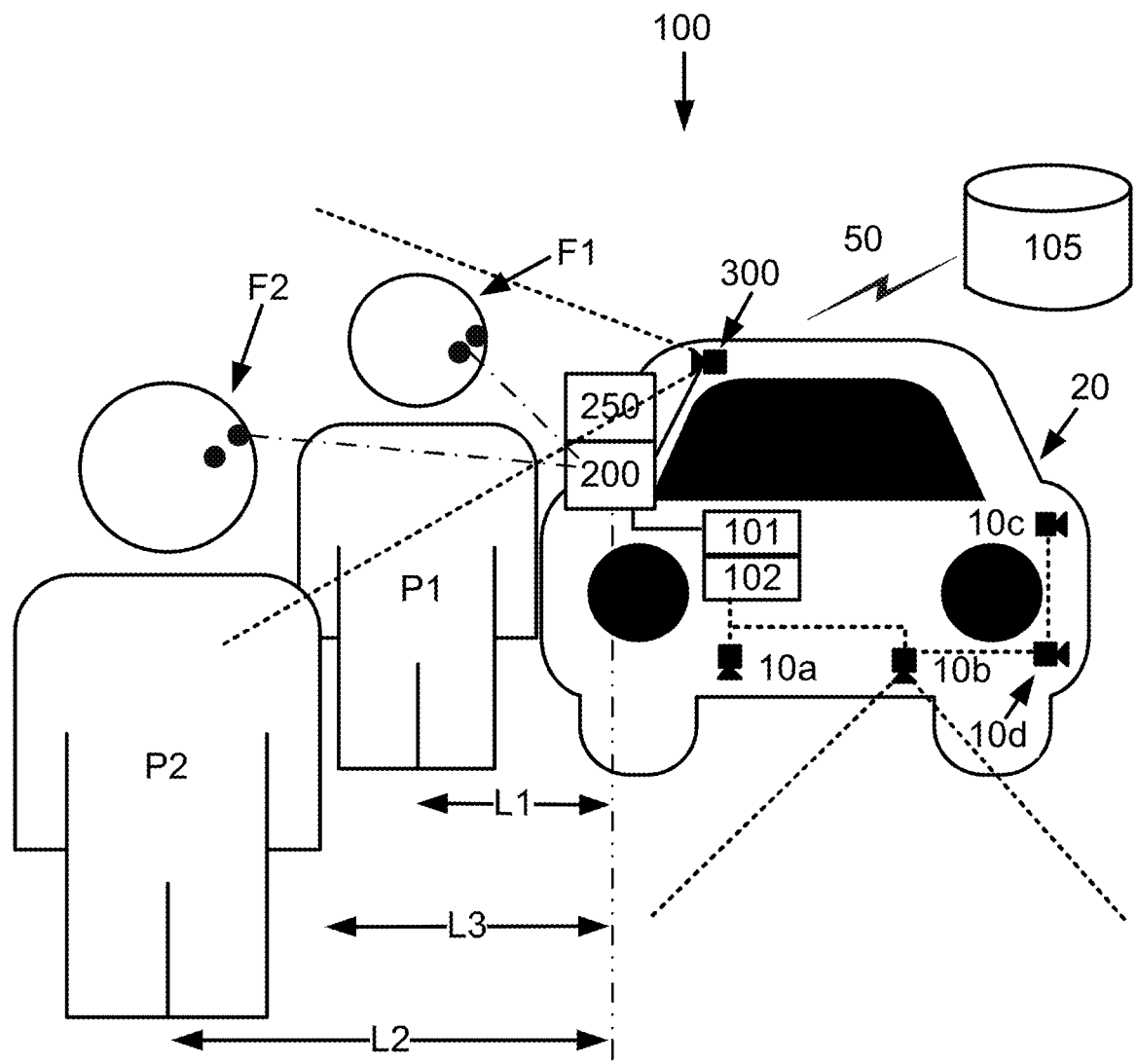
FIG. 1B illustrates an example of the proposed security system used in a vehicle.

The disclosure proposes a security system 100 for preventing misuse of sensitive information entered by an authorized person. The proposed security system 100 is illustrated in FIG. 1A and FIG. 1B. FIG. 1A illustrates an example of the proposed security system 100 used in a portable electronic device 10 and FIG. 1B illustrates an example of the proposed security system 100 used in a vehicle 20. According to an aspect the security system 100 is a vehicle security system for preventing misuse of sensitive information entered by an authorized person e.g. sensitive information entered for getting access to a vehicle.

Typically the portable electronic device 10 in FIG. 1A is a smartphone, tablet or a laptop computer. The proposed security system 100 may be used in other combinations and devices. The security system 100, comprise an input interface 200 configured to receive input of information by a person, such as a typed text, a password, a Personal Identification Number, a slide gesture, a voice command, a gesture, a sequence of gestures etc. According to an aspect the input interface 200 is a touch sensitive display for inputting information. According to an aspect the input interface 200 is a microphone for inputting sound. According to an aspect the input interface 200 is a camera for detecting gestures. According to an aspect the input interface 200 is a dedicated hardware such as a number keyboard for inputting a Personal Identification Number.

Figure 2A:
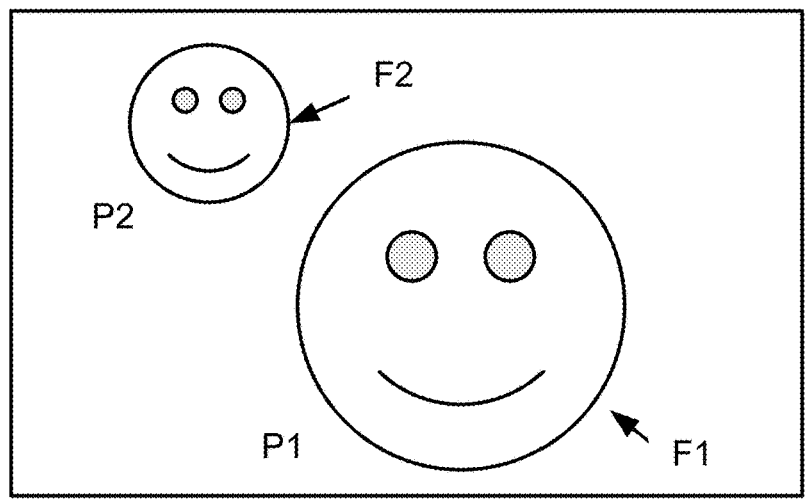
FIG. 2A illustrates a camera view of the first person and the second person obtained by the camera according to an aspect of the disclosure.
Figure 2B:
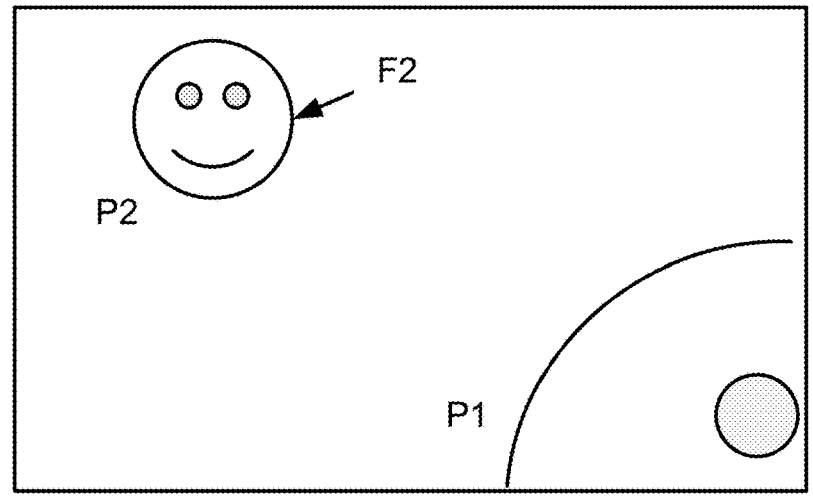
FIG. 2B illustrates a camera view of the first person and the second person obtained by the camera according to an aspect of the disclosure where the first person is partly outside of the camera view.

The security system 100, comprise a camera 300 configured to perform face detection of a person. According to an aspect the camera 300 is a built in camera of an electronic device 10 as illustrated in FIG. 1A. According to an aspect the camera 300 is mounted on or in a vehicle 20 as illustrated in FIG. 1B. According to an aspect the camera 300 is arranged to capture images of a person P1, P2 in the vicinity of the input interface 200 as illustrated in FIG. 2A and FIG. 2B. The camera 300 is configured to perform face detection of a person P1, P2. Face detection is typically based on face recognition parameters that can for example be data associated with e.g. measurement of a human face, such as distances between the eyes and/or the chin, nose and other points that relate to face recognition.

The security system 100, comprise a memory 101 configured to store information and a processing circuitry 102 as illustrated in FIG. 1B. The portable electronic device 10 in FIG. 1A comprises a memory and a processing circuitry which are not illustrated in FIG. 1A. According to an aspect security system 100 comprise a memory 101 and processing circuitry 102 that are at a remote location 105 as illustrated in FIG. 1B. According to an aspect the remote location is a server 105 that is wirelessly connected to the security system 100 via a communication network 50. In one example the communication network 50 is a standardized wireless local area network such as a Wireless Local Area Network, WLAN, Bluetooth™, ZigBee, Ultra-Wideband, Near Field Communication, NFC, Radio Frequency Identification, RFID, or similar network. In one example the communication network is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. The communication network 50 can also be a combination of both a local area network and a wide area network. The communication network 50 can also be a wired network. According to some aspects of the disclosure the communication network is defined by common Internet Protocols.

The processing circuitry 102 is connected to the input interface 200, the camera 300 and the memory 101 configured to cause security system 100 to activate a first input session wherein the input interface 200 is adapted to receive input of sensitive information by a first person P1 in an operational vicinity of the input interface 200. According to an aspect the first input session is a request to enter any of a password, a Personal Identification Number, a slide gesture, a voice command or a gesture. According to an aspect the operational vicinity is defined by the type of requested input. For e.g. inputting a password, a Personal Identification Number or a slide gesture on a touch sensitive display the operational vicinity is typically an arm's length. For e.g. inputting a voice command the operational vicinity is within hearing distance, which is typically a number of meters depending on the sensitivity of the microphone. For e.g. inputting a gesture the operational vicinity is typically within the view of the camera that is detecting the gesture.

Figure 3:
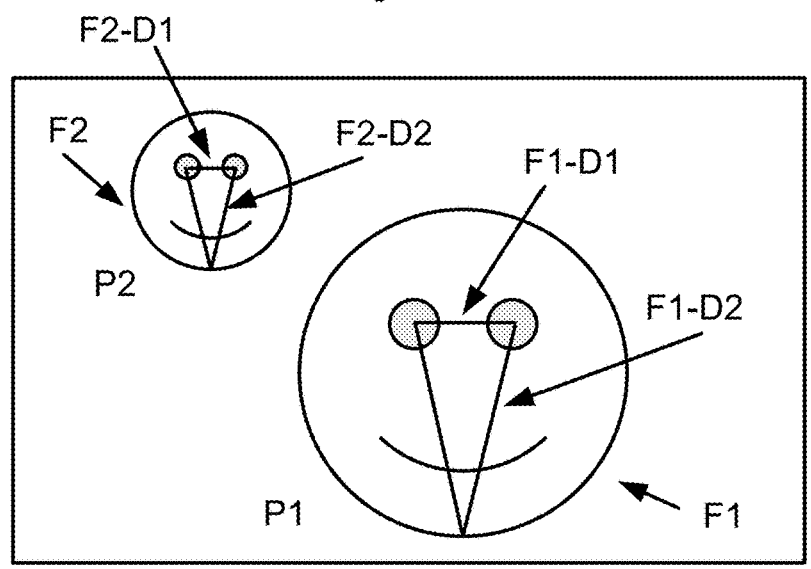
FIG. 3 illustrates face recognition data of the first person and face recognition data of the second person obtained by the camera according to an aspect of the disclosure.
Figure 4:
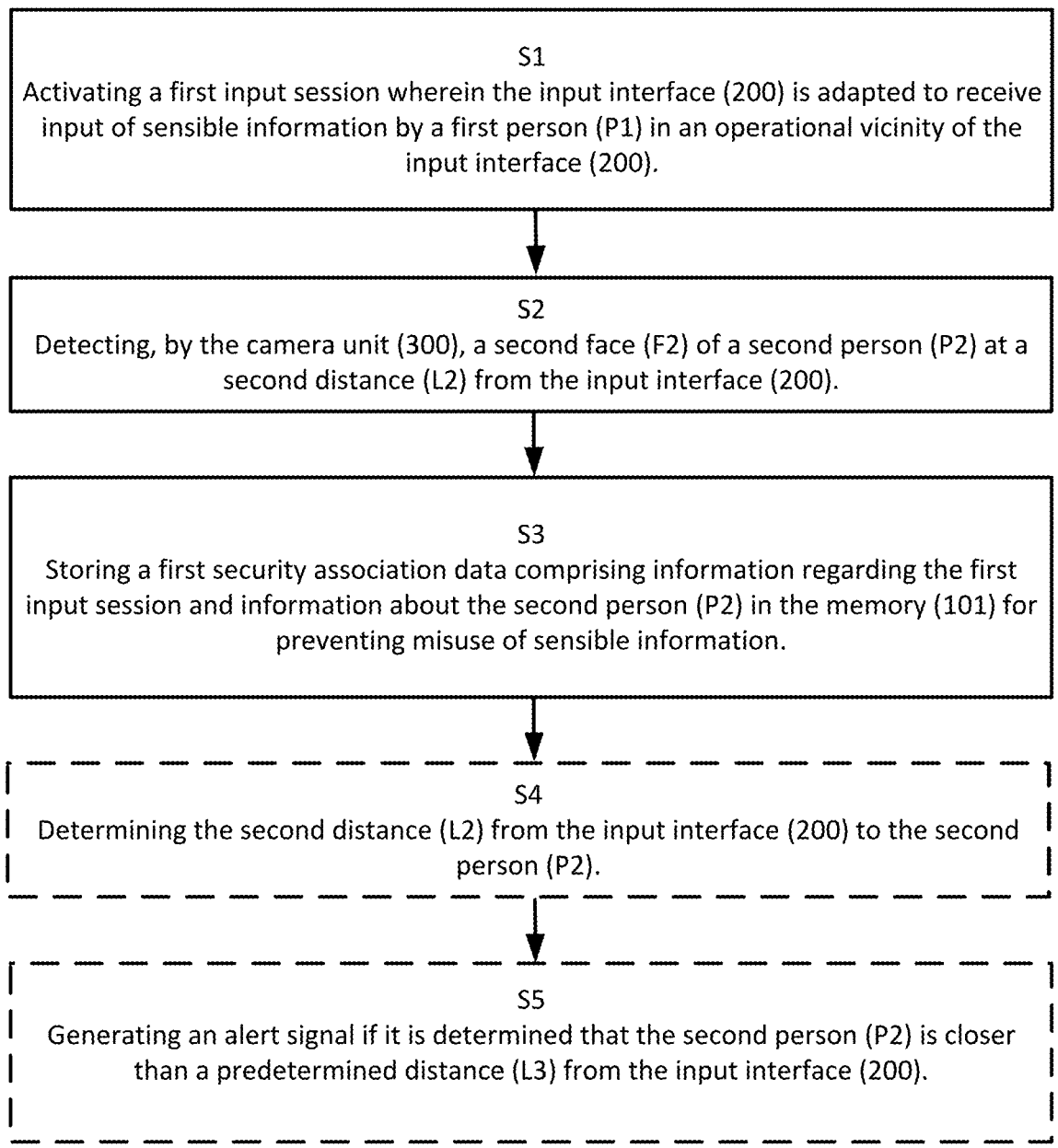
FIG. 4 illustrates a flow chart of the method steps according to an aspect of the disclosure.

The processing circuitry 102 is further configured to cause security system 100 to detect, by the camera unit 300, a second face F2 of a second person P2 at a second distance L2 from the input interface 200. FIG. 2A illustrates a camera view of the first person P1 and the second person P2 obtained by the camera 300 according to an aspect of the disclosure. However, the first person P1 can be partly outside of the camera view, as illustrated in FIG. 2B, and still detect the second face F2 of the second person P2. According to an aspect the second distance L2, as illustrated in FIG. 1A and FIG. 1B, is determined by using face recognition parameters of the second face F2 of the second person P2. As illustrated in FIG. 3, face recognition parameters such as the distance between the eyes F2-D1 and/or the distance between the left eye and the chin F2-D2 of the second face F2 can be determined by image processing. With the knowledge of such face recognition parameters in combination with e.g. the specification of the camera 300 and with known predetermined distances from the input interface 200 in relation to known face recognition parameters, a function can be described that is determining the second distance L2. According to an aspect the second distance L2 from the input interface 200 to the second person P2 is dependent on the location of the camera 300 in relation to the input interface 200. During installation or calibration of the security system 100, the location of the camera 300 in relation to the input interface 200 is considered for achieving a correct determination of the second distance L2.

The processing circuitry 102 is further configured to cause the security system 100 to store a first security association data comprising information regarding the first input session and information about the second person P2 in the memory 101 for preventing misuse of sensitive information. According to an aspect the information regarding the first input session comprising at least one of a time stamp, running software application, login details and displayed information. According to an aspect the information about the second person comprising at least one of a face recognition parameter, a voice recording, a video recording, presence data and movement data. An advantage with the security system 100 is that the stored first security association data can be used for take further actions to prevent unauthorized use of sensitive information. In other words, with the knowledge of the identified second person and with the knowledge of what sensitive information that may have been observed by the second person, measures can be taken to enhance security.

According to an aspect the processing circuitry 102 is further configured to cause the security system 100 to determine the second distance L2 from the input interface 200 to the second person P2 and generate an alert signal if it is determined that the second person P2 is closer than a predetermined distance L3 from the input interface 200. According to an aspect the predetermined distance L3 is set during installation or calibration of the security system 100 for enabling a comfort zone for a first person P1. In other words the security system 100 is configured to alert a first person P1 of a second person P2 if the second person P2 is closer than the predetermined distance L3 from the input interface 200 in order to make the first person P1 aware of the risk that the second person P2 may be at a distance to observe sensitive information.

According to an aspect the alert signal is displaying an image of the second person P2 on a display 250. According to an aspect the alert signal is displaying an image of the face of the second person P2 on a display 250. According to an aspect the display 250 is a built in display of an electronic device as illustrated in FIG. 1A. According to an aspect the display 250 is a separate display as illustrated in FIG. 1B. This means that the first person P1 can observe the face of the second person P2 on the display 250. The first person can then decide if the second person P2 is a trusted person or if the second person P2 is a non-trusted person. The first person P1 is also able to decide if the second person P2 is approaching or if the second person P2 is e.g. just passing by. According to an aspect the display 250 is combined with the input interface 200 in a touch sensitive display as in the portable electronic device 10 as illustrated in FIG. 1A. According to an aspect the display 250 a separate display that is installed adjacent to an input interface 200.

According to an aspect the alert signal is any of a recorded voice or a predefined sound. An advantage with this is that the first person P1 is alerted by sound in an intuitive way and does not need to see or observe the alert signal vi a display 250. According to an aspect the playback of the recorded voice or the predefined sound is adapted so that it can be heard by the second person P2 and thereby frighten off the second person P2. This means that the recorded voice or the predefined sound can also likely be heard by other persons that are in the vicinity.

According to an aspect the processing circuitry 102 is configured to cause the security system 100 to detect, by the camera unit 300, a first face F1 of the first person P1 at a first distance L1 from the input interface 200. The FIG. 2A illustrates a camera view of the first person P1 and the second person P2 obtained by the camera 300 according to an aspect of the disclosure. The first distance L1 is determined by using the same function as described above for determining the second distance L2 but using face recognition parameters of the first face F1 of the first person P1. According to an aspect, it is determined that if the first distance L1 from the input interface 200 to the first face F1 of the first person P1 is within the operational vicinity of the input interface 200, then the first person P1 is the operating the input interface 200. In other words, the security system 100 is configured to determine who the first person P1 is and to establish that it is the first person P1 that is operating the input interface 200. According to an aspect the first distance L1 is a distance that is less than a predefined operational vicinity for operating the input interface 200.

According to an aspect the processing circuitry 102 is configured to cause the security system 100 to determine, by using face recognition data of the first person P1 and face recognition data of the second person P2 obtained by the camera 300, e.g. as illustrated in FIG. 2A, if the first person P1 and the second person P2 are authorized to input sensitive information via the input interface 200. In one example the first person P1 and the second person P2 are family members, friends, colleagues etc., both known from face recognition data by the security system 100. An advantage with this is that if the first person P1 and the second person P2 are both authorized to input sensitive information via the input interface 200 then there is no need to store a first security association data or to alert the first person P1.

According to an aspect the processing circuitry 102 is configured to cause the security system 100 to analyze the first security association data to determine what possible sensitive information that could have been observed by the second person P2 and send information about what possible sensitive information that could have been observed by the second person P2 to an authorized person or authorized entity. This means that a certain sensitive information can be isolated and dealt with by an authorized person or authorized entity in order to prevent misuse of sensitive information. In other words the possible sensitive information that could have been observed by the second person P2 can be changed or locked for further use. Example of possible sensitive information that could have been observed by the second person P2 is e.g. a password, login details, a gesture, a voice command etc. According to an aspect, information about what possible sensitive information that could have been observed by the second person P2 is sent using any of an e-mail, an application notification, a text message, a telephone call etc. Example of an authorized person or authorized entity is a service provider, an operator, the first person P1, a family member, an insurance company, a vehicle repair centre etc.

In one use case a service provider, such as a vehicle sharing service provider, is notified that a Personal Identification Number could have been observed by the second person P2 when the first person P1, that is a customer to the vehicle sharing service provider, tried to access a vehicle at a certain time. The vehicle sharing service provider automatically informs the first person P1 via an application notification and prompts the first person P1 to change the Personal Identification Number within a certain time period in order to be able to continue using the service.

According to an aspect the processing circuitry 102 is configured to cause the security system 100 to analyze the first security association data to determine what possible sensitive information that could have been observed by the second person P2 and discard any further attempt to input the same sensitive information via the input interface 200 again. This means that the security system 100 is adapted to identify possible sensitive information that could have been observed by the second person P2 and take measure to prevent further use of that possible sensitive information. Hence, as an alternative action referring back to the previous mentioned use case, the vehicle sharing service provider automatically bans the Personal Identification Number that could have been observed by the second person P2 from further usage.

According to an aspect the security system 100 further comprising a sensor 10a, 10b, 10c, 10d configured to detect a person approaching the sensor 10a, 10b, 10c, 10d. An advantage with a sensor 10a, 10b, 10c, 10d is that the sensor 10a, 10b, 10c, 10d can be used for other purposes when not used in the security system 100. Another advantage is the placement of the sensor 10a, 10b, 10c, 10d is flexible. In the example as illustrated in FIG. 1B when the security system 100 is used in a vehicle, the sensor 10a, 10b, 10c, 10d can be any existing sensor installed on or in the vehicle primarily used for other purposes. According to an aspect the sensor 10a, 10b, 10c, 10d is any of a lidar sensor, a radar sensor, a sonar sensor, a humidity sensor or a temperature sensor. In other words plural types of sensors 10a, 10b, 10c, 10d can be used and the sensor can be used for other purposes such as a parking sensor, a parking camera, a collision detection sensor etc. In the example as illustrated in FIG. 1B, the sensor 10b is a parking camera that has a camera view that is covering the area behind the vehicle. Hence, by utilizing the parking camera 10b, a greater area can be covered to detect a second person P2. Today it is common with plural sensors 10a, 10b, 10c, 10d such as plural cameras and plural lidar sensors on vehicles, hence it is likely that e.g. a 360 degree camera coverage around the vehicle is possible by utilizing plural existing camera sensors mounted on the vehicle. Other type of sensors such lidar sensors can further be used to determine distances to objects. According to an aspect a lidar sensor is used to detect that a person approaching the input interface 200.

According to an aspect the processing circuitry 102 is configured to cause the security system 100 to determine, by using any of the camera 300 or the sensor 10a, 10b, 10c, 10d, that the second person P2 is approaching the input interface 200 and generate an alert signal based on that the second person P2 is approaching the input interface 200. In other words this means that the camera 300 or the sensor 10a, 10b, 10c, 10d can be used to alert the first person P1 if the second person P2 is approaching. An advantage is that the camera 300 and the sensor 10a, 10b, 10c, 10d can be configured to operate in combination.

According to an aspect the security system 100 is configured to initiate communication with a remote surveillance system to start recording of the second person P2 by the remote surveillance system. An advantage with this is that the remote surveillance system can be configured to record e.g. images and/or sound of the second person P2 to get more details of the second person P2, e.g. for enhanced face detection. According to an aspect the remote surveillance system is a camera 300 of another electronic device 10 or another vehicle 20. According to an aspect the remote surveillance system is a dash camera located in in the vehicle 20 or in another vehicle. According to an aspect the remote surveillance system is a home security system.

The disclosure further proposes a vehicle 20 comprising a door entrance system, a communication interface for communication with a remote server 105 via a communications network 50 and the security system 100, and any aspects of the security system 100 as previously described, wherein the security system 100 is adapted to send face recognition data obtained by the camera 300 to the remote server 105 for determining if a person is authorized to access the door entrance system. In other words face recognition data of a first person P1 and a second person P2 can be used to determine, at the remote server 105, if the first person P1 and/or the second person P2 are authorized to access the door entrance system. According to an aspect the case face recognition data obtained by the camera 300 is stored in the remote server 105. According to an aspect a first person P1 is able to store face recognition data of a further person. In one example the further person is a known vehicle occupant such as a family member, a friend and/or a colleague. In one example a vehicle sharing service provider can request a trusted user to add further face recognition data of further persons e.g. by using the camera 300 of a portable electronic device 10 of the trusted user. The face recognition data is then stored and associated with the trusted user as authorized persons.

The disclosure further proposes a method for preventing misuse of sensitive information entered by an authorized person. The method comprising the steps S1 activating a first input session wherein the input interface 200 is adapted to receive input of sensitive information by a first person P1 in an operational vicinity of the input interface 200. This is followed by the step S2 detecting, by the camera unit 300, a second face F2 of a second person P2 at a second distance L2 from the input interface 200. This is followed by the step S3 storing a first security association data comprising information regarding the first input session and information about the second person P2 in the memory 101 for preventing misuse of sensitive information. An advantage with the security system 100 is that the stored first security association data can be used for take further actions to prevent unauthorized use of the sensitive information. In other words, with the knowledge of the identified second person and with the knowledge of what sensitive information that may have been observed by the second person, measures can be taken to enhance security.

According to an aspect the method further comprising the steps S4 determining the second distance L2 from the input interface 200 to the second person P2 and then the step S5 generating an alert signal if it is determined that the second person P2 is closer than a predetermined distance L3 from the input interface 200. In other words the security system 100 is configured to alert the first person P1 of a second person P2 if the second person P2 is closer than a certain distance L2 from the input interface 200 in order to make the first person P1 aware of the risk that the second person P2 may be at a distance to observe sensitive information.

The disclosure further proposes a computer program product comprising a non-transitory computer readable medium, having thereon a computer program comprising program instructions, the computer program being loadable into a processing circuitry 102 and configured to cause execution of the method according to any of claims 14 through 15 when the computer program is run by the processing circuitry 102.

The different aspects of the disclosure can be combined with one or more of the other different aspects. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A vehicle security system for preventing misuse of sensitive information entered by an authorized person, the vehicle security system comprises:
    an input interface configured to receive input of information by a person;
    a camera configured to perform face detection of a person;
    a memory configured to store information;
    a processing circuitry connected to the input interface, the camera and the memory configured to cause vehicle security system to:
        activate a first input session wherein the input interface is adapted to receive input of sensitive information by a first person in an operational vicinity of the input interface;
        detect, by the camera unit, a second face of a second person at a second distance from the input interface;
        store a first security association data comprising information regarding the first input session and information about the second person in the memory for preventing misuse of sensitive information;
        analyze the first security association data to determine what possible sensitive information that could have been observed by the second person; and
        send information about what possible sensitive information that could have been observed by the second person to an authorized person or authorized entity.

2. The vehicle security system according to claim 1, wherein the processing circuitry is further configured to cause the vehicle security system to:
    determine the second distance from the input interface to the second person; and
    generate an alert signal if it is determined that the second person is closer than a predetermined distance from the input interface.

3. The vehicle security system according claim 2, wherein the alert signal is displaying an image of the face of the second person on a display.

4. The vehicle security system according to claim 1, wherein the processing circuitry is configured to cause the vehicle security system to:
    detect, by the camera unit, a first face of the first person at a first distance from the input interface.

5. The vehicle security system according to claim 1, wherein the processing circuitry is further configured to cause the vehicle security system to:
    determine, by using face recognition data of the first person and face recognition data of the second person obtained by the camera, if the first person and the second person are authorized to input sensitive information via the input interface.

6. The vehicle security system according to claim 1, wherein the vehicle security system further comprising a sensor configured to detect a person approaching the sensor.

7. The vehicle security system according to claim 6, wherein the processing circuitry is further configured to cause the vehicle security system to:
    determine, by using any of the camera or the sensor, that the second person is approaching the input interface; and
    generate an alert signal based on that the second person is approaching the input interface.

8. The vehicle security system according to claim 1, wherein the vehicle security system is configured to initiate communication with a remote surveillance system to start recording of the second person by the remote surveillance system.

9. A vehicle comprising
    a door entrance system;
    a communication interface for communication with a remote server via a communications network;
    and the vehicle security system according to claim 1, wherein the vehicle security system is adapted to send face recognition data obtained by the camera to the remote server for determining if a person is authorized to access the door entrance system.

10. A vehicle security system for preventing misuse of sensitive information entered by an authorized person, the vehicle security system comprises:
an input interface configured to receive input of information by a person;
a camera configured to perform face detection of a person;
a memory configured to store information;
a processing circuitry connected to the input interface, the camera and the memory configured to cause vehicle security system to:
activate a first input session wherein the input interface is adapted to receive input of sensitive information by a first person in an operational vicinity of the input interface;
detect, by the camera unit, a second face of a second person at a second distance from the input interface;
store a first security association data comprising information regarding the first input session and information about the second person in the memory for preventing misuse of sensitive information
analyze the first security association data to determine what possible sensitive information that could have been observed by the second person; and
discard any further attempt to input the possible sensitive information that could have been observed by the second person via the input interface again.

11. The vehicle security system according to claim 10, wherein the processing circuitry is further configured to cause the vehicle security system to:
determine the second distance from the input interface to the second person; and
generate an alert signal if it is determined that the second person is closer than a predetermined distance from the input interface.

12. The vehicle security system according to claim 10, wherein the processing circuitry is configured to cause the vehicle security system to:
detect, by the camera unit, a first face of the first person at a first distance from the input interface.

13. The vehicle security system according to claim 10, wherein the processing circuitry is further configured to cause the vehicle security system to:
determine, by using face recognition data of the first person and face recognition data of the second person obtained by the camera, if the first person and the second person are authorized to input sensitive information via the input interface.

14. The vehicle security system according to claim 10, wherein the vehicle security system further comprising a sensor configured to detect a person approaching the sensor; and
wherein the processing circuitry is further configured to cause the vehicle security system to:
determine, by using any of the camera or the sensor, that the second person is approaching the input interface; and
generate an alert signal based on that the second person is approaching the input interface.

15. The vehicle security system according to claim 10, wherein the vehicle security system is configured to initiate communication with a remote surveillance system to start recording of the second person by the remote surveillance system.

16. A vehicle comprising
a door entrance system;
a communication interface for communication with a remote server via a communications network;
and the vehicle security system according to claim 10, wherein the vehicle security system is adapted to send face recognition data obtained by the camera to the remote server for determining if a person is authorized to access the door entrance system.

17. A method for preventing misuse of sensitive information entered by an authorized person, the method comprising:
activating a first input session wherein an input interface is adapted to receive input of sensitive information by a first person in an operational vicinity of the input interface;
detecting, by a camera unit, a second face of a second person at a second distance from the input interface;
storing a first security association data comprising information regarding the first input session and information about the second person in the memory for preventing misuse of sensitive information;
analyzing the first security association data to determine what possible sensitive information that could have been observed by the second person; and
sending information about what possible sensitive information that could have been observed by the second person to an authorized person or authorized entity.

18. The method according to claim 17 further comprising:
determining the second distance from the input interface to the second person; and
generating an alert signal if it is determined that the second person is closer than a predetermined distance from the input interface.

19. A method for preventing misuse of sensitive information entered by an authorized person, the method comprising:
activating a first input session wherein an input interface is adapted to receive input of sensitive information by a first person in an operational vicinity of the input interface;
detecting, by a camera unit, a second face of a second person at a second distance from the input interface;
storing a first security association data comprising information regarding the first input session and information about the second person in the memory for preventing misuse of sensitive information;
analyzing the first security association data to determine what possible sensitive information that could have been observed by the second person; and
discarding any further attempt to input the possible sensitive information that could have been observed by the second person via the input interface again.

20. The method according to claim 19 further comprising:
determining the second distance from the input interface to the second person; and
generating an alert signal if it is determined that the second person is closer than a predetermined distance from the input interface.

* * * * *